United States Patent
Garcia Fernandez et al.

(10) Patent No.: US 12,556,632 B2
(45) Date of Patent: Feb. 17, 2026

(54) METHOD AND SYSTEM FOR SURFACING INCOMING CALL DISPLAY DATA

(71) Applicant: Doximity, Inc., San Francisco, CA (US)

(72) Inventors: Ricardo Mauricio Garcia Fernandez, Beaverton, OR (US); Aaron Arthur Gray, Birmingham, AL (US); Emmanuel Lagarrigue Lazarte, Buenos Aires (AR); Andrew Porterfield, Noblesville, IN (US); Elizabeth Doris Marie Stephenson, Port St. Lucie, FL (US)

(73) Assignee: Doximity, Inc., San Francisco, CA (US)

( * ) Notice: Subject to any disclaimer, the term of this patent is extended or adjusted under 35 U.S.C. 154(b) by 476 days.

(21) Appl. No.: 18/314,807

(22) Filed: May 9, 2023

(65) Prior Publication Data

US 2024/0380838 A1  Nov. 14, 2024

(51) Int. Cl.
*H04M 3/42* (2006.01)

(52) U.S. Cl.
CPC ... *H04M 3/42059* (2013.01); *H04M 3/42093* (2013.01)

(58) Field of Classification Search
CPC ......... H04M 3/42059; H04M 3/42093; H04M 3/42042; H04M 2201/38
USPC ........................................ 455/418
See application file for complete search history.

(56) References Cited

U.S. PATENT DOCUMENTS

| 8,787,542 B2 * | 7/2014 | Farah ................ | H04M 3/42042 379/201.11 |
| 2012/0173622 A1 * | 7/2012 | Toledano ............. | H04L 65/611 709/204 |
| 2014/0128043 A1 * | 5/2014 | Shen ...................... | H04W 4/16 455/414.1 |

FOREIGN PATENT DOCUMENTS

CN  113438373 A  *  9/2021  ........ H04M 3/42195

* cited by examiner

*Primary Examiner* — Ahmad F. Matar
*Assistant Examiner* — Jirapon Tulop
(74) *Attorney, Agent, or Firm* — Womble Bond Dickinson (US) LLP (57) ABSTRACT

A system and method to surface incoming call display data. The system includes a memory storing call source data of a call source and one or more processing devices. The one or more processing devices are to initiate a call using the call source data to a call destination. The one or more processing devices are further to receive incoming call display data determined in response to receiving the call. The incoming call display data includes data displayed by a user interface associated with the call destination in response to receiving the call. The one or more processing devices are further to transmit incoming call display image data based on the incoming call display data to a computing device to display a representation of the data displayed by the user interface associated with the call destination.

20 Claims, 7 Drawing Sheets

METHOD AND SYSTEM FOR SURFACING INCOMING CALL DISPLAY DATA

TECHNICAL FIELD

This disclosure generally relates to phone calls. In particular, this disclosure relates to caller-identification (caller-ID) verification of phone calls by surfacing incoming call display data to facilitate verification.

BACKGROUND

Healthcare providers (e.g., doctors, nurses, etc.) may provide various health related services and products to patients. Patients may often visit health care facilities (e.g., hospitals, clinics, etc.) to receive the health-related services and products. For example, a patient may visit a clinic or a hospital for a checkup or to speak with a doctor about a particular medical/health issue. Healthcare providers may also speak with patients on phone calls. Patient phone calls are an important way in which healthcare providers share information, including important diagnostic and treatment information with patients. Phone conversations are similarly used for other businesses transactions such as, for example, sales, shipping, customer support, and other business services. The exchange of information over phone calls is one of the most important aspects of modern commerce.

BRIEF DESCRIPTION OF THE DRAWINGS

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

As described above, many doctors and other professionals have a need to speak with clients, patients, and others receiving services. Unfortunately for the doctors attempting to contact their patients, the general public is less likely to accept a call from a number they do not recognize. A caller, such as a physician, may call a recipient, such as a patient, to communicate information, e.g., to provide health-related services. The physician may place the call from a personal mobile device, however, the physician may prefer that the patient see the phone number of the incoming call as that of the healthcare facility whom the physician represents for that health-related service, rather than from the personal mobile device. The physician may therefore place the call through a software application running on the personal mobile device, which substitutes a phone number of the healthcare facility as the caller identifier delivered with the call. As described below, such legitimate phone number substitution may be used to cause the patient to see the incoming call as coming from the healthcare facility, even when the call is placed from the personal mobile device.

Thus, there is a need for efficiently verifying what caller-ID data is distributed or displayed to patients when they receive the calls. Many doctors and other healthcare professionals and businesses have a need to provide specific caller-ID data for their calls to patients. For example, a doctor calling from an office or a hospital may wish to understand how the caller-ID data is displayed to the recipient of the call. Although the present disclosure is described with reference to healthcare provider calls and services, the present disclosure should not be interpreted as being limited in any way by this description. For example, the subject matter of the present disclosure can be utilized in any field where a user may wish to customize the caller-ID data displayed to the recipient of a call and to verify the caller-ID data received by the user. For example, the subject matter described herein can be used in retail or enterprise settings, call-centers, customer support, attorney settings, or any other suitable setting. Additionally, any user of any profession may use the systems and methods described herein. While the present disclosure is depicted such that a doctor is initiating the call, that should not be read as limiting the scope of the present disclosure. The terms "doctor", "healthcare professional", and the like can be replaced with "user" to include any professional, and the terms "hospital", "healthcare facility" and the like can be replaced with "retail office", "accounting office" or any other suitable facility or location.

The method, system, and non-transitory computer readable storage medium of the disclosure describes an example implementation for surfacing incoming call display data.

Figure 1:
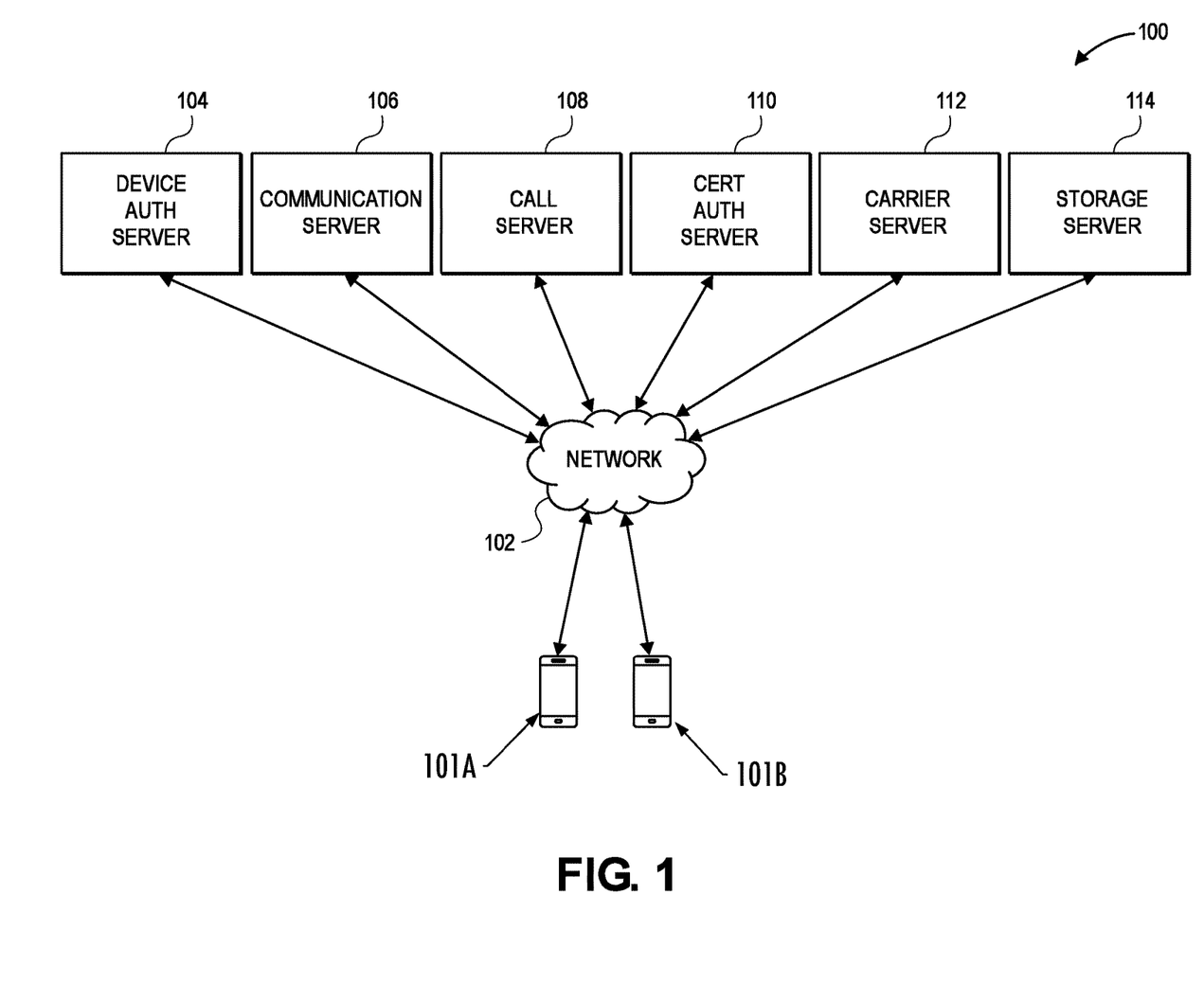
FIG. 1 is a diagram illustrating a network architecture in accordance with one or more embodiments of the disclosure.

FIG. 1 is a diagram illustrating an example network architecture, in accordance with one or more embodiments of the disclosure. A network architecture 100 includes a network 102 interconnecting one or more computing devices 101, e.g., mobile device(s), with one or more other system components, including a device authorization server 104, a communication server 106, a call server 108, a certification authority server 110, a carrier server 112, and/or a storage server 114. More particularly, the system components can be in data communication with each other through the network 102.

Examples of computing devices 101 may include, but are not limited to, a mobile or non-mobile device, e.g., a smartphone, a tablet computer, a laptop computer, or a desktop computer, etc. The mobile devices 101 can be owned by a single entity. The mobile devices 101 may be grouped into two or more groups based on integrated circuits installed in and/or contained by the mobile devices 101. More particularly, each mobile device 101 can contain an integrated circuit, such as a Subscriber Identification Module (SIM) card, associated with a mobile carrier, phone settings, and/or mobile contract types. By way of example, the network can include a first mobile device 101A being associated with a first mobile carrier and a second mobile device 101B associated with a second mobile carrier.

Accordingly, the mobile devices 101 can be grouped by respective mobile carriers, phone settings, and contract types such that call handling by the mobile devices 101 of the system can provide insight into how each of the mobile device configurations influence handling of received calls.

The mobile devices 101 of the system can simulate computing devices owned by other users, such as patients, who use services and/or products provided by one or more service providers, such as healthcare providers. More particularly, such users may use a computing device to communicate with one or more service providers, and in the event that such computing devices have SIM cards associated with the same mobile carriers, phone settings, and contract types as the mobile devices 101 in the system, the treatment of calls from the service providers can be assumed to be the same.

Healthcare providers may be people who provide health related services and/or products to the user. Examples of healthcare providers may include, but are not limited to, doctors, pharmacists, dentists, nurses, therapists, psychologists, technicians, surgeons, etc. Each healthcare provider may use a computing device (e.g., smartphone, tablet computer, etc.) to communicate with one or more of the users of the service providers. Communications between the healthcare provider and the user may be one-directional communications. For example, the healthcare provider can initiate a call to a user such that a computing device of the user receives the call. The call may be made using a substituted phone number, as described above. If the user calls this number back, they may be connected to, e.g., a facility having the phone number that was substituted, rather than the computer device that initiated the call. Accordingly, by simulating the call handling performed by similar patient mobile devices, the mobile devices 101 of the system can simulate call handling of such substituted numbers. For example, the mobile devices 101 of the system can determine what caller-ID information will be displayed by various carriers.

The other components of the system can operate interactively to place calls to the mobile devices 101, and to monitor how such calls are handled by the mobile devices 101. The individual system components are described next.

A device authorization server 104 can provide authorization for other system components to interact. For example, the device authorization server 104 can perform a device authorization handshake with one or more of the mobile devices 101, as described below, to grant permission to the mobile devices 101 to make requests of another system component, such as a communication server 106.

In an embodiment, the communication server 106 may connect with one or more of the networked mobile devices 101 to facilitate call requests that will initiate phone calls to the mobile devices 101. For example, a mobile device 101 may include one or more software applications to cause a call to be placed from the communication server 106 to the mobile device 101. The software applications running on the mobile device 101 can cause the call to be answered and terminated, and can log data from the call that may be used to identify caller-ID data of the call. The communication server 106 can pass along information about the call to the call server 108. For example, the communication server can initiate a call using call source data (e.g., a phone number of a hospital or doctor's office chosen by a doctor who is initiating the call) and pass along that information to the mobile device the doctor is intending to call.

In some instances, the communications server may connect with the one or more networked mobile devices 101 and have capability to capture screen shots or screen captures of a call screen of the one or more mobile devices. This process is discussed in further detail below.

The call server 108 can initiate the call to a carrier server 112, which will connect the phone call to the mobile devices 101. The call server 108 can create and send a request message that initiates the call using a signaling protocol, e.g., the Session Initiation Protocol. The call server 108 can make the call request using the information passed along by the communication server 106. The call server 108 may be referred to as an originating service provider.

The certification authority server 110 can confirm verification and/or verify phone numbers as being associated with known entities, such as healthcare facilities. The carrier server 112 can complete the call to the mobile device 101. The call may be communicated through additional, intermediate servers between the call server 108 and the carrier server 112 (not shown). The carrier server 112 can be maintained by a same or different entity than that which maintains the call server 108. For example, the carrier server 112 and/or the call server 108 may be maintained by an entity that provides communication tools for making and receiving phone calls, sending and receiving text messages, and performing other communication functions. The communication functions can be performed through web service application programming interfaces, for example. In an embodiment, the carrier server 112 is maintained by a mobile carrier. The mobile carrier can be a carrier associated with the integrated circuit installed in the mobile device 101 receiving the phone call. The carrier server 112 may be referred to as a terminating service provider. The terminating service provider can determine whether and how to send the phone call to the recipient device.

The storage server 114 can be a cloud server providing storage accessed on demand by other system components. For example, the storage server 114 can store logged data received from the mobile devices 101 after completion of the phone call. The logged data may indicate caller-ID data, including historical logs of caller-ID data for calls received by the mobile devices 101. For example, the logged data can be used to track how caller-ID data has changed for received calls over time for each of the mobile devices 101. Additionally, the storage server 114 can be used to store and process captured screen shots of the call screens of the one or more mobile devices.

Processes described below may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the processes may be performed by the various components of the system, including the servers and mobile devices 101 described above.

Figure 2A:
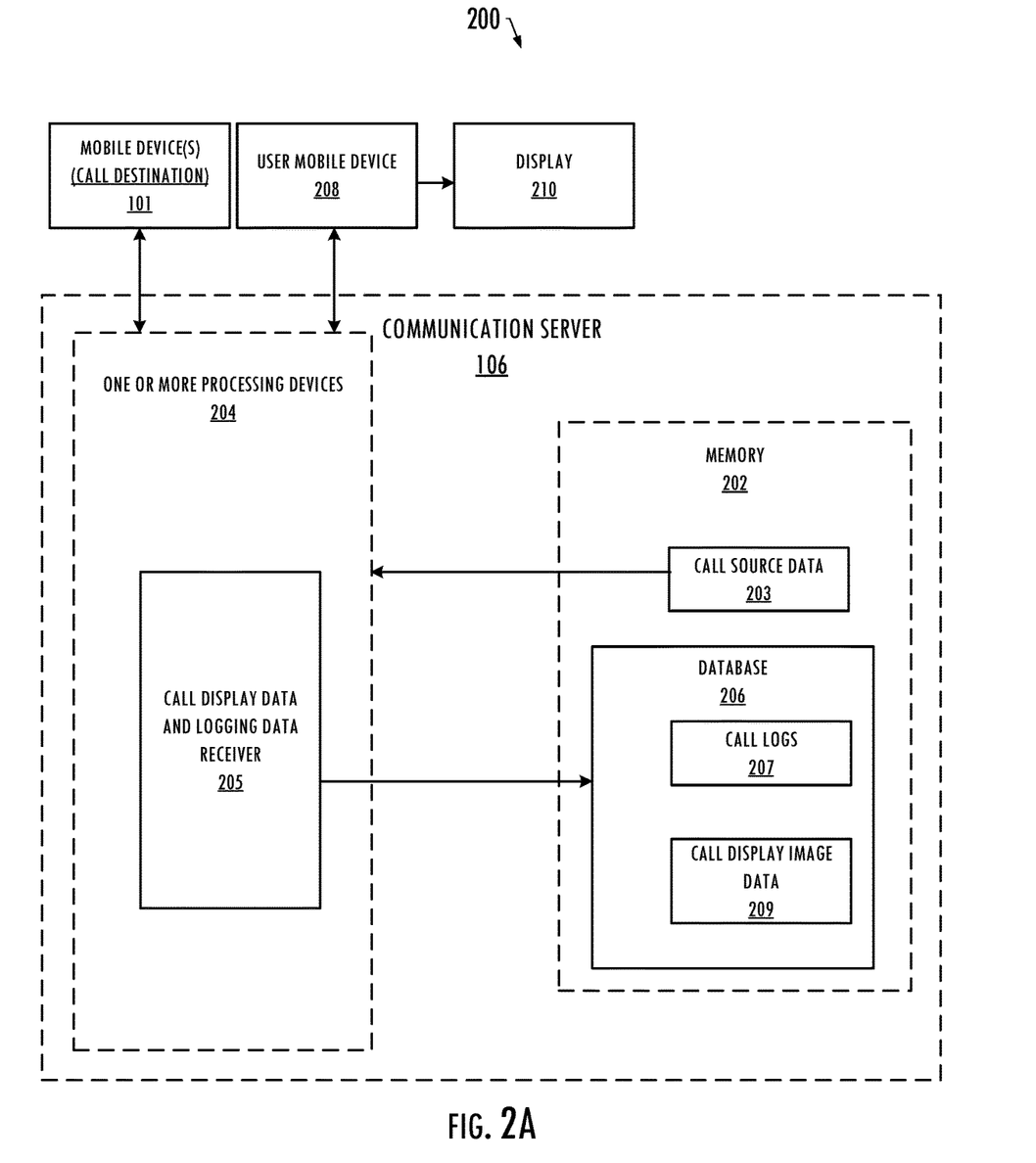
FIG. 2A is a block diagram of a system for surfacing incoming call display data in accordance with one or more embodiments of the disclosure.
Figure 4:
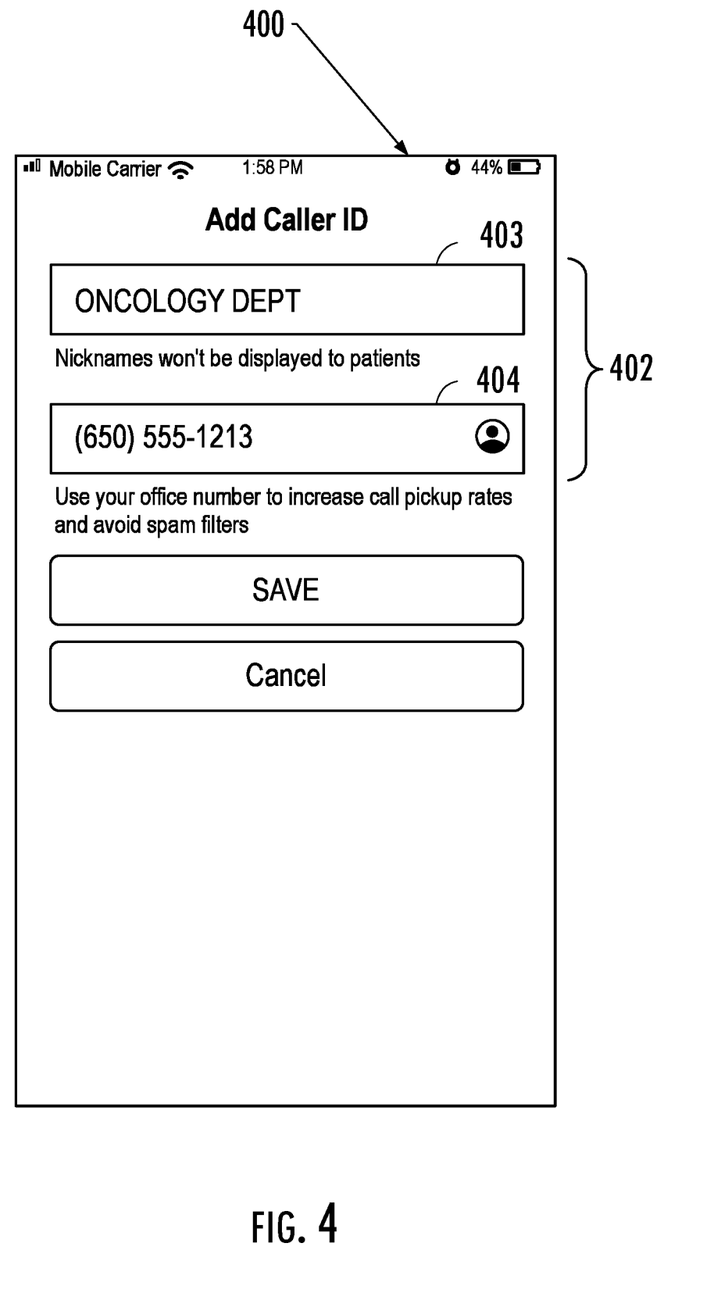
FIG. 4 is a pictorial view of a user interface for adding a caller-ID profile in accordance with one or more embodiments of the disclosure.

FIG. 2A illustrates a block diagram of an example system 200 for surfacing incoming call display data in accordance with one or more embodiments of the present disclosure. In some embodiments, the system 200 comprises a server, such as communication server 106 shown in FIG. 1. The system includes a memory 202, such as a persistent memory storage device (e.g., a hard drive), storing call source data 203 of a call source. The call source data 203 can be data that includes a phone number of a healthcare facility associated with the user/doctor initiating the call created by the user generating a profile on an application running on their mobile phone. The call source is the healthcare facility the doctor or user chooses to have the call be sourced from. The call source can also be any facility that a non-doctor user chooses to have the call be sourced from. In this regard, using the software application described above, such as a mobile application on a user mobile device 208 in communication with the communication server 106, the doctor or other user may create a profile on the application, and configure caller-ID on the profile to indicate that the doctor is calling from a hospital, healthcare office, or other location and the profile will include the caller-ID information for the hospital or other office the doctor selects to associate with. The call source data 203 can include the caller-ID information for the hospital or other office configured by the doctor or user. For example, if the doctor configures the profile to include caller-ID information of the hospital, the hospital's phone number will be part of the call source data 203. The doctor will configure their profile with a phone number associated with a medical treatment facility for which they are a provider or otherwise associated and using the present system 200, when the doctor makes a call, the end user receiving the call will receive caller-ID data on their call screen of their phone, indicating the call is from the hospital, not the doctor. The doctor or user may configure multiple numbers, such as the hospital at which they perform surgeries and their clinic where they see patients for regular appointments. In either event, the doctor can select one of their configured facility phone numbers on the software application and the phone numbers will be used to "mask" their true phone number so that the patients and other recipients will see on their call screens that a call being made to them by the doctor is from the hospital or clinic associated with the doctor. This should increase the likelihood of the patient answering the call, as they recognize the incoming number as that of a facility where they receive medical care. FIG. 4 illustrates an example user interface for a software application for allowing the doctor or other user to configure such a profile described above.

The system 200 further includes one or more processing devices 204 to access the memory and execute instructions stored thereon. The communication server 106 is used to initiate one or more calls using the call source data 203 of the call source. In some embodiments, the call source data includes at least a phone number of the call source. For example, the call source may be a hospital phone, doctor's office phone, or other device whose phone number the doctor wishes to display as the source of the call to the recipient (e.g., patient).

In some embodiments, the doctor (or other user) initiates the call by accessing an application on their mobile device (e.g., user mobile device 208), the application operates on the communication server 106 or is in communication with the communication server. The doctor selects a profile (e.g., hospital, doctor's office), and the phone number of the selected profile is stored in in the memory 202 as the call source data 203. The one or more processing devices then access the call source data 203 in the memory and initiates a call (e.g., by communicating with another server not shown to generate the call) using the call source data to a call destination. For example, the call destination can be any of the mobile devices 101 shown in FIG. 1. In some examples, the communication server 106 causes one or more calls to be generated, each call to one or more mobile devices 101, and each mobile device being associated with a major phone or mobile carrier, such as the mobile devices described in FIG. 1 above.

In other words, the communication server may cause several calls to be generated, each call generated using the call source data, and each call being received by a different mobile device (e.g., mobile device(s) 101) which may be associated with a different carrier than the other mobile devices. The mobile devices 101 may include a first mobile device 101A associated with a first mobile carrier and a second mobile device 101B associated with a second mobile carrier. The mobile device carriers associated with each call will receive one of the calls caused by the communication server to be generated, and the respective mobile carriers will determine the caller-ID data to be displayed on each of the mobile devices based on the call source data 203.

In some embodiments, the one or more processing devices 204 are to cause the call to be generated using call source data from the call source, the call source data including at least a phone number of the call source. For example, the one or more processing devices are further to cause the call to be generated from a server (e.g., call server 108 from FIG. 1), wherein the call source data 203 includes a phone number of the call source, to the call destination comprising a mobile device (e.g., mobile device 101). That is, the communication server 106 is to cause the call to be generated by another server using the call source data 203 (e.g., the hospital or other facility associated with the profile selected by the doctor or other user). Once the call is generated, one of the mobile devices 101 receives the call.

Figure 2B:
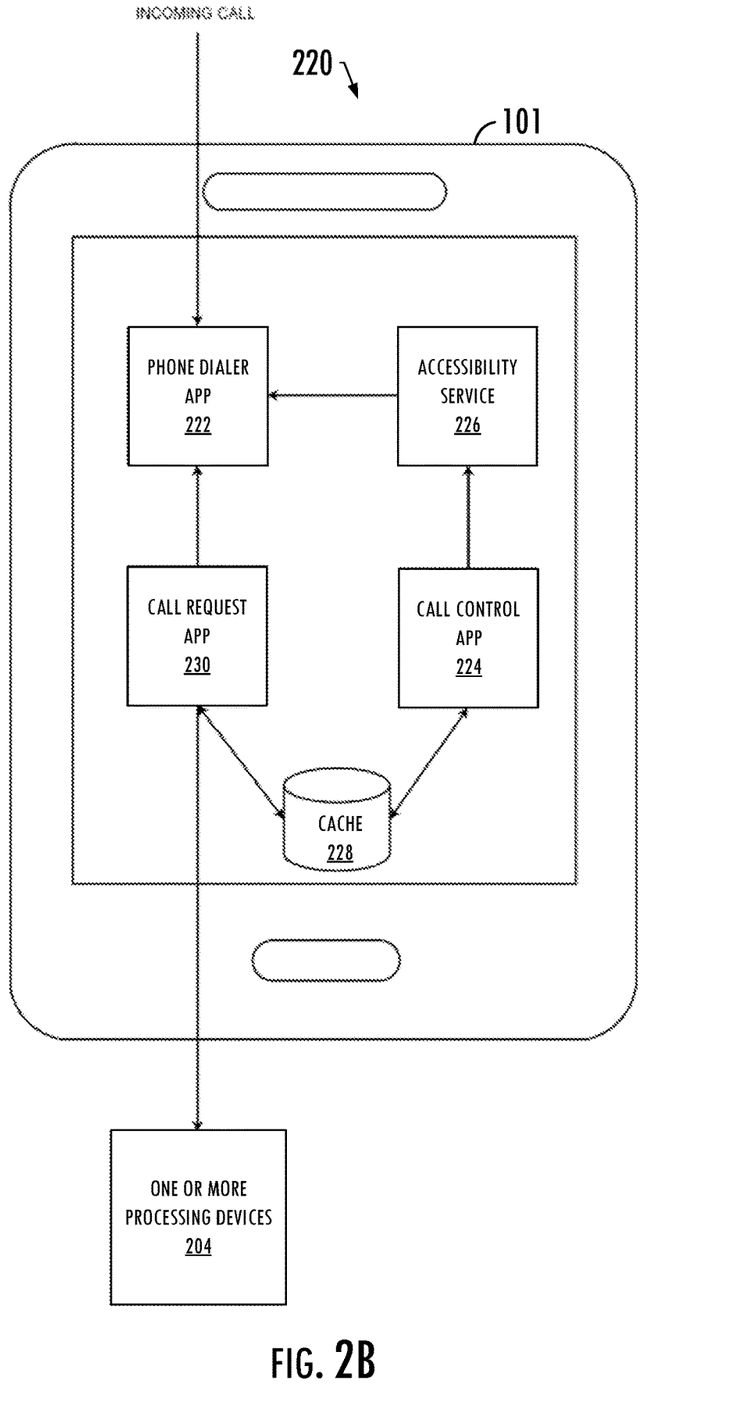
FIG. 2B is an operational flow diagram of a call environment in accordance with one or more embodiments of the disclosure.

FIG. 2B illustrates a communication environment 220 between a mobile device 101, which receives the call initiated by the communication server 106. A phone dialer application 222 running on the mobile device 101 can cause the incoming call to be displayed on a user interface of the mobile device 101. The phone dialer application 222 displays the caller-ID data on the call screen of the mobile device 101 for the call being received.

A call control application 224 running on the mobile device 101 can communicate with an accessibility service 226 of the operating system running on the mobile device 101, to capture a screenshot of the call screen of the mobile device 101 (e.g., the call destination mobile device) when the mobile device receives the call. In some embodiments, one or more processing devices can capture the screenshot, whether it be the accessibility service 226 of the mobile device 101 or any other suitable processing device, the one or more processing devices 204. The call control application 224 can recognize that incoming call has been received via the accessibility service. In response to such recognition, the call control application 224 can cause the accessibility service 226 to capture the screenshot of the user interface displayed on the mobile device 101. The captured screenshot and other call display image data are written to the local cache 228.

A call request application 230 can determine when the incoming call terminates. In response to such recognition, the call request application 230 can retrieve data associated with the call from the local cache 228 on the mobile device 101. The data can include the captured screenshot of the call screen, other call display image data and metadata. The metadata can include call parameters. The call request application 230 can send the data retrieved from the local cache 228 of the mobile device 101 to the one or more processing device 204 of the communication server 106. If multiple calls are made, each to different call destinations (mobile device(s) 101), a discrete screenshot of each user interface or call screen of each mobile device 101 is taken and submitted to the one or more processing devices 204 of the communication server 106.

Referring back to FIG. 2A, the one or more processing devices 204 receives the incoming call display data (i.e., the screenshot(s) of the call screens) at a call display data and logging data receiver 205. The call display data and logging data receiver can store the call display image data 209 in a database 206 or elsewhere in memory 202. Additionally, the one or more processing devices 204 are to transmit incoming call display image data based on the incoming call display data to a computing device to display a representation of the data displayed by the user interface associated with the call destination. For example, the one or more processing devices are further to receive incoming call display image data (e.g., one or more captured screenshots, each captured screenshot being of a call screen on the user interface associated with the mobile device 101, i.e., the call destination). Then, the one or more processing devices 204 are further to transmit the incoming call display image data to a mobile device (e.g., user mobile device 208) associated with the phone number of the call source for display on a user interface of the mobile device (e.g., display 210). That is, the screenshot(s) of the call destination call screen(s) is/are sent by the communication server 106 to the mobile device associated with the doctor, or other professional, so that the doctor can view the screenshot and verify that the caller-ID information displayed to the actual call screen of the call recipient is accurate.

However, in some embodiments, transmission of the incoming call display image data to the mobile device 208 is not simultaneous with the initiation of a call from the user or doctor. Instead, the incoming call display image data (e.g., a screenshot of the call screen of the device that received a call with the call source phone number) is transmitted by the communication server 106 to the mobile device 208 of the doctor when the doctor selects the profile associated with the call source. For example, when the doctor or other user selects, in the software application, the profile of the hospital to which they want to be the call source (i.e., the call recipient will see a phone call from the hospital on their caller-ID and not from the doctor, when the doctor tries to make a call using the system), the communication server 106 will transmit a previously captured screenshot stored in the database 206 or other storage location to the mobile device 208. The screenshot will be from a previous call made to one of the mobile devices 101 and from the same source, and will show how the caller-ID information was displayed on the call screen of the destination when the previous call was made. The doctor or user will be able to view the screenshot and determine if the incoming call display data on the destination device was correct. A more detailed example is provided below with respect to FIG. 3.

In some embodiments, in addition to the captured screenshots and other call display image data received by the call destination mobile device 101 used to test the phone number selected by the user or doctor, the one or more processing devices 204 are further to receive call logs for respective calls from the mobile device 101 of the call destination in response to receiving the call. For example, as the mobile device(s) 101 receives the call, they may take various logs as the call is received and the logs 207 may be sent to the communication server 106 and stored in the database 206 for future processing and review.

An example use of the system 200 described above is illustrated in the description with respect to FIG. 3 below.

Figure 3:
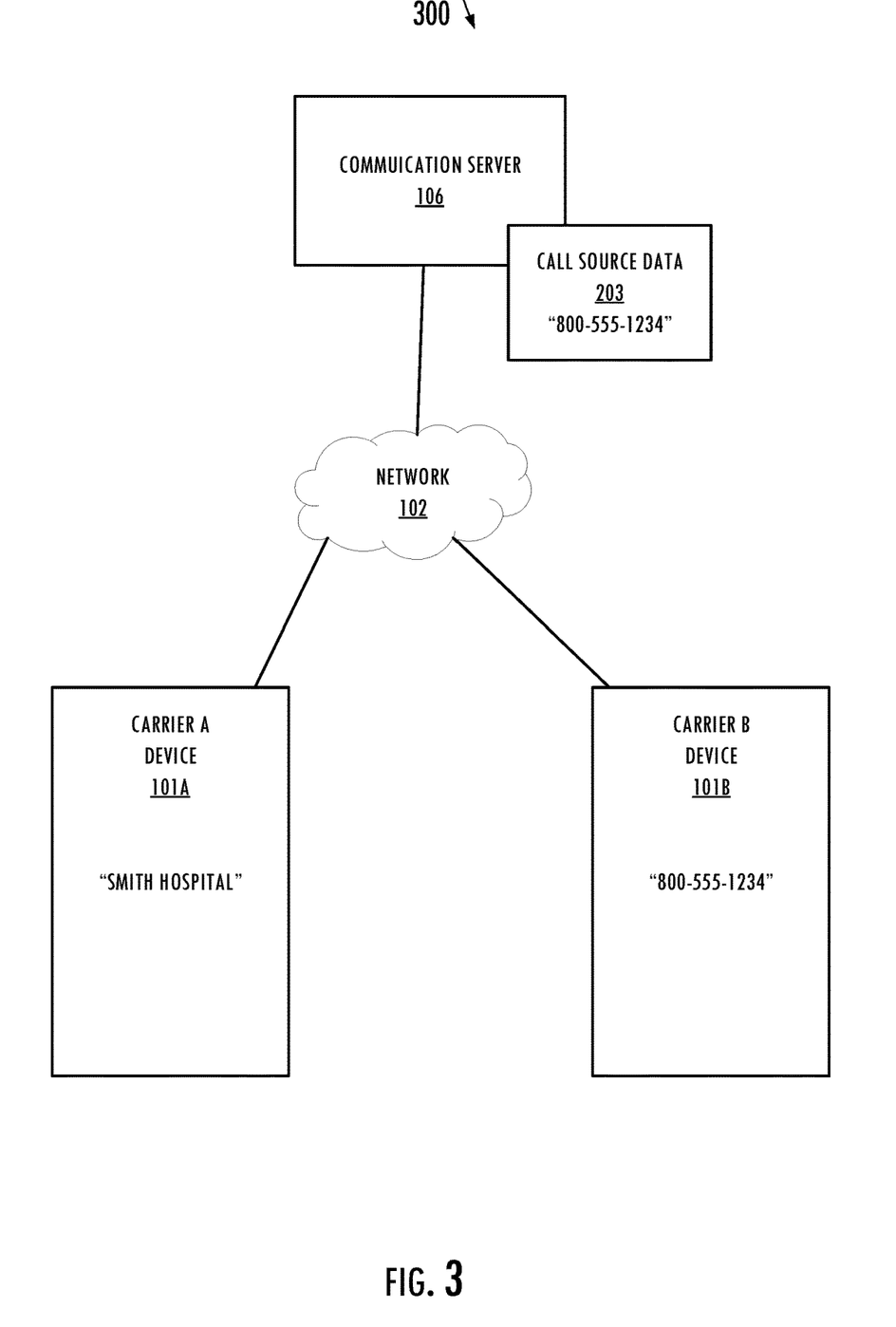
FIG. 3 is a network diagram of a mobile communications network in accordance with one or more embodiments of the disclosure.

FIG. 3 is a network diagram of an example mobile communications network 300 in accordance with one or more embodiments of the disclosure. As shown, the mobile communications network includes the communication server 106 with call source data 203 (e.g., phone number) of "800-555-1234" associated with "SMITH HOSPITAL". In some embodiments, the presented example is performed by the system before the doctor or user selects SMITH HOSPITAL as a profile to which they wish to use for masking their calls. The communication server causes several calls to be generated using the call source data and those calls are transmitted across the network 102 to carrier A device 101A and carrier B device 101B. Carrier A translates the call source data into caller-ID data "SMITH HOSPITAL". That is, the caller-ID data displayed on the call screen of carrier A device 101A is "SMITH HOSPITAL". Carrier B translates the call source data into caller-ID data "800-555-1234". That is, the caller-ID data displayed on the call screen of carrier B device 101B is "800-555-1234".

When the calls are made, the call control application 224 and accessibility service 226 operating on the call destination (i.e., carrier A device 101A and carrier B device 101B) are to capture screenshots of carrier A device 101A showing "SMITH HOSPITAL" on the call screen and of carrier B device 101B showing "800-555-1234" on the call screen. These screenshots are then associated with their respective carriers and stored in the database 206 in FIG. 2A as call display image data 209. When the doctor or other user opens the software application and selects "SMITH HOSPITAL" or the "800-555-1234" phone number as part of their profile, the one or more processing device 204 are to receive from the carrier devices 101A and 101B the appropriate screenshots associated with the various carriers of the mobile devices 101A and 101B and send the mobile device 208 of the doctor each screenshot for the selected profile to present on a display 210 of their mobile device 208 and to confirm that the caller-ID data is accurately provided to the mobile devices 101A and 101B.

FIG. 4 is a pictorial view of a user interface 400 for adding a caller-ID profile in accordance with an embodiment of the disclosure. In some embodiments, the user may add a caller-ID profile through the user interface. For example, the user can select a tab through the user interface indicating the ability to add the caller-ID profile 402. The communication server 106 can receive a request to add the caller-ID profile 402 to the user account of the user. For example, the user account can include the caller-ID profile 402 associated with the caller-ID name "office," and the user may want to add an additional caller-ID profile associated with another caller-ID name. The caller-ID profile 402 entered in the user interface 400 illustrated in FIG. 4 includes the caller-ID "nickname" 403 "oncology department." This is just a convenient label for the doctor or other user to quickly identify the correct number to use. The call source data used for this profile will be the "(650) 555-1234" number and that will be used as the source phone number of a call made by the doctor if they select this profile to make the call. It will be appreciated that the user may be a physician who wants the recipient of the call to see an incoming call as originating from the oncology department, even though the call originates from a personal mobile computing device. Such substitute number may be advantageous, for example, by increasing recipient trust in the incoming call, as the displayed number is more likely to be familiar. In addition, the recipient can call the physician back at the oncology department phone number, rather than a personal phone number.

Addition of the caller-ID profile 402 can include entry of a caller identifier 404 associated with the caller-ID name 403. The caller identifier 404 may be the substitute phone number for the oncology department, for example.

Figure 5:
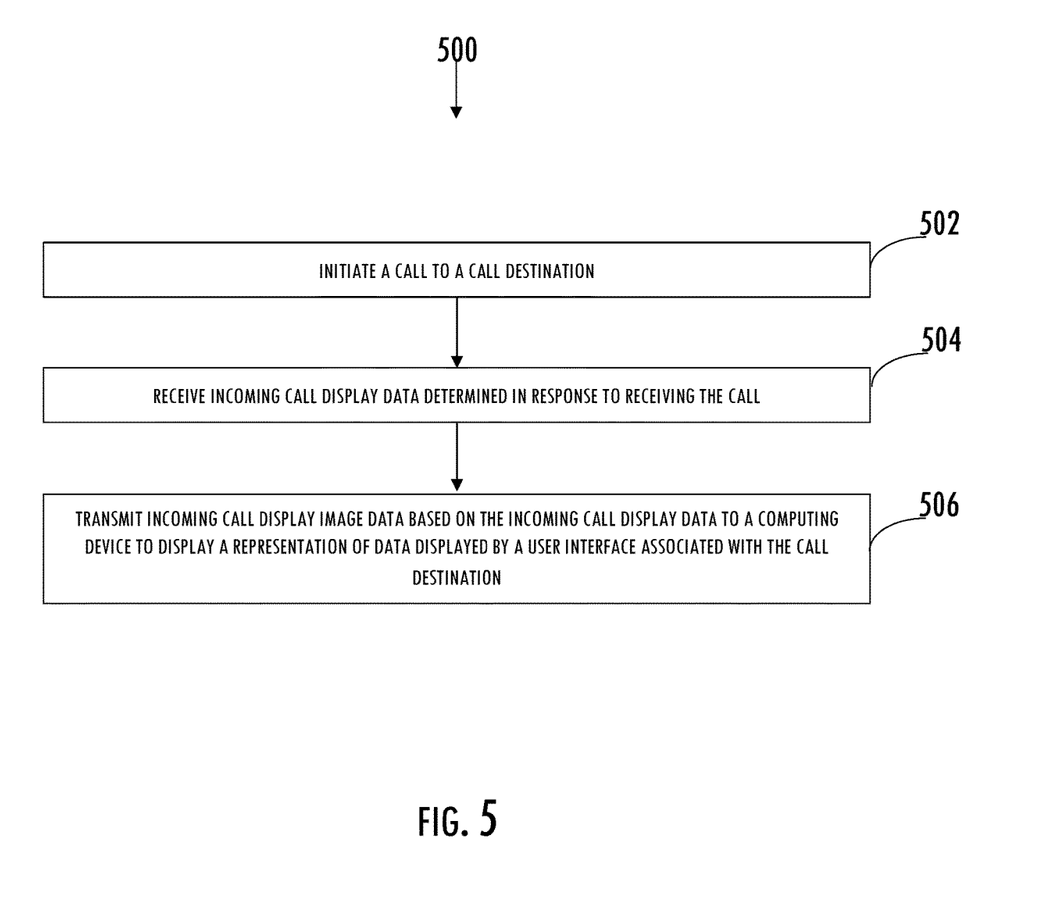
FIG. 5 is a flow diagram of a method in accordance with one or more embodiments of the disclosure.

FIG. 5 is a flow diagram of an example method 500 of surfacing incoming call display data, in accordance with one or more embodiments of the disclosure. At operation 502, the system initiates a call to a call destination. At operation 504, the system receives incoming call display data determined in response to receiving the call. The incoming call display data includes data displayed by a user interface associated with the call destination in response to receiving the call. At operation 506, the system transmits incoming call display image data based on the incoming call display data to a computing device to display a representation of the data displayed by the user interface associated with the call destination.

Figure 6:
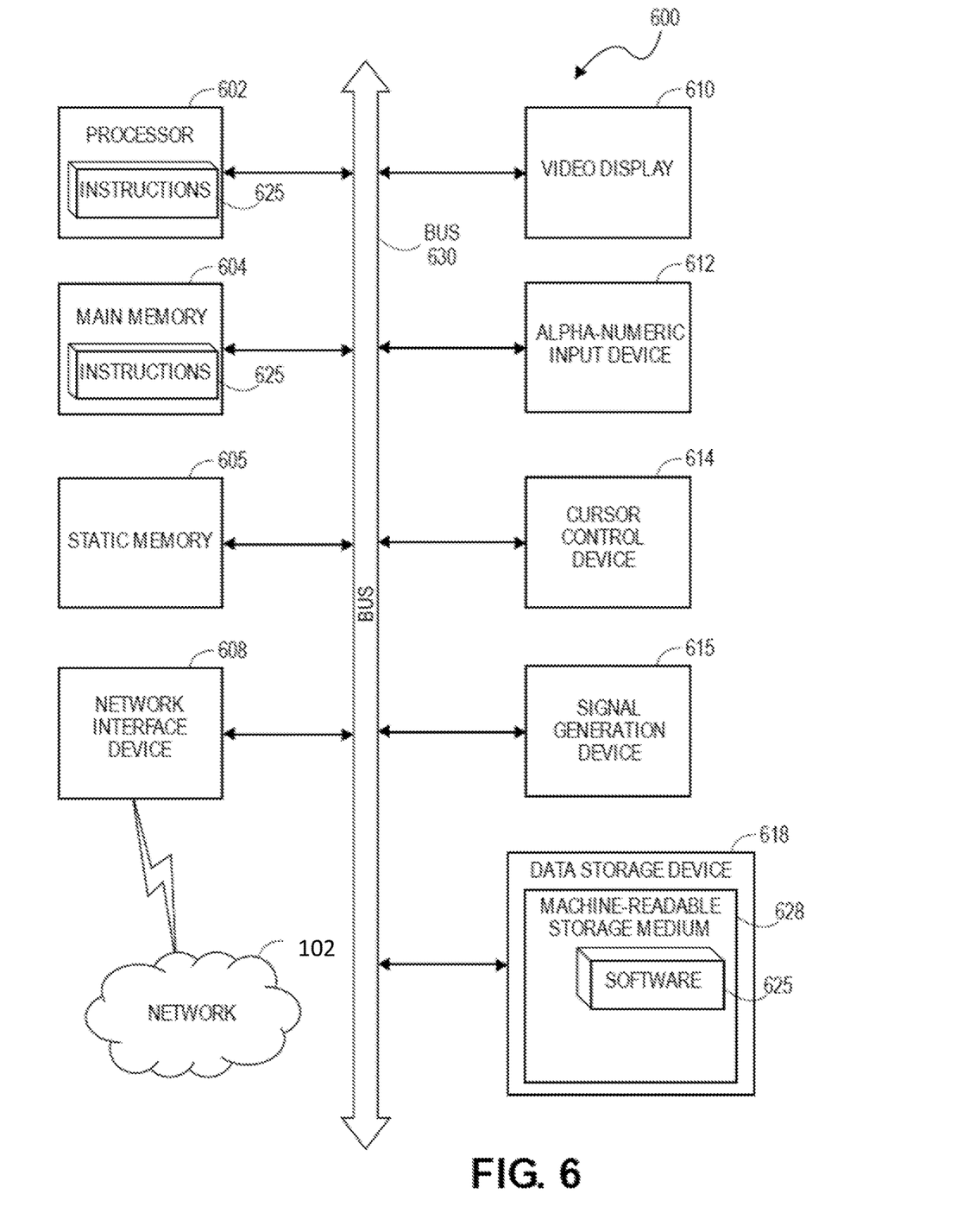
FIG. 6 is a block diagram of a computing device that may perform one or more of the operations described in accordance with one or more embodiments of the disclosure.

FIG. 6 is a block diagram of an example computing device 600 that may perform one or more of the operations described herein (such as the operations of the one or more processing devices 204 described in FIG. 2A), in accordance with some embodiments. More particularly, computing device 600 may be integrated in or separate from any of the servers and/or devices described above to perform any of the described operations. Computing device 600 may be connected to other computing devices in a local area network (LAN), an intranet, an extranet, and/or the Internet. The computing device may operate in the capacity of a server machine in the client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include one or more processing devices (e.g., a processing device, a general purpose processing device, a PLD, etc.) 602, a main memory 604 (e.g., synchronous dynamic random access memory (DRAM), read-only memory (ROM)), a static memory 605 (e.g., flash memory and a data storage device 618), which may communicate with each other via a bus 630.

The one or more processing devices 602 may be provided by one or more general-purpose processing devices such as a microprocessor, central processing unit, or the like. In an illustrative example, processing device(s) 602 may comprise a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. Processing device(s) 602 may also comprise one or more special-purpose processing devices such as an application specific integrated circuit (ASIC), a field programmable gate array (FPGA), a digital signal processor (DSP), network processor, or the like. The processing device(s) 602 may be configured to execute the operations described herein, in accordance with one or more aspects of the present disclosure, for performing the operations and steps discussed herein.

Computing device 600 may further include a network interface device 608 which may communicate with a network 102. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 615 (e.g., a speaker). In one embodiment, video display unit 610, alphanumeric input device 612, and cursor control device 614 may be combined into a single component or device (e.g., an LCD touch screen).

Data storage device 618 may include a non-transitory computer-readable storage medium 628 on which may be stored one or more sets of instructions 625 that may include instructions for carrying out the operations described herein, in accordance with one or more aspects of the present disclosure. Instructions 625 may also reside, completely or at least partially, within main memory 604 and/or within processing device(s) 602 during execution thereof by computing device 600, main memory 604 and processing device(s) 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of surfacing incoming call display data comprising:
    initiating a call to a call destination;
    receiving incoming call display data determined in response to receiving the call, wherein the incoming call display data includes data displayed by a user interface associated with the call destination in response to receiving the call; and
    transmitting incoming call display image data based on the incoming call display data to a computing device to display a representation of the data displayed by the user interface associated with the call destination.

2. The method of claim 1, wherein initiating the call comprises causing the call to be generated from a server, using a phone number associated with a call source as a source phone number of the call, to the call destination comprising a mobile device.

3. The method of claim 1, wherein the call destination comprises a mobile device, and wherein the user interface associated with the call destination is displayed on a call screen of the mobile device.

4. The method of claim 3, wherein receiving the incoming call display data includes capturing, by one or more processing devices, a screenshot of the call screen of the mobile device when the mobile device receives the call.

5. The method of claim 3 further comprising:
receiving call logs collected by the mobile device of the call destination, the call logs collected in response to receiving the call, wherein the call logs are for respective calls received.

6. The method of claim 5 further comprising receiving or more captured screenshots, each captured screenshot being of a call screen on the user interface associated with the mobile device.

7. The method of claim 1, wherein initiating the call includes generating the call using call source data from a call source, the call source data including at least a phone number of the call source.

8. The method of claim 7, wherein transmitting the incoming call display image data includes transmitting the incoming call display image data for display by a mobile device associated with the phone number of the call source.

9. A system for surfacing incoming call display data comprising:
a memory storing call source data of a call source; and
one or more processing devices to:
initiate a call using the call source data to a call destination;
receive incoming call display data determined in response to receiving the call, wherein the incoming call display data includes data displayed by a user interface associated with the call destination in response to receiving the call; and
transmit incoming call display image data based on the incoming call display data to a computing device to display a representation of the data displayed by the user interface associated with the call destination.

10. The system of claim 9, wherein the one or more processing devices are further to cause the call to be generated from a server, wherein the call source data includes a phone number of the call source, to the call destination comprising a mobile device.

11. The system of claim 9, wherein the call destination comprises a mobile device, and wherein the user interface associated with the call destination is to be displayed on a call screen of the mobile device.

12. The system of claim 11, wherein the one or more processing devices are further to capture a screenshot of the call screen of the mobile device when the mobile device receives the call.

13. The system of claim 11, wherein the one or more processing devices are further to receive call logs for respective calls from the mobile device of the call destination in response to receiving the call.

14. The system of claim 13, wherein the one or more processing devices are further to receive one or more captured screenshots, each captured screenshot being of a call screen on the user interface associated with the mobile device.

15. The system of claim 9, wherein the one or more processing devices are to cause the call to be generated using the call source data from the call source, the call source data including at least a phone number of the call source.

16. The system of claim 15, wherein the one or more processing devices are further to transmit the incoming call display image data to a mobile device associated with the phone number of the call source for display on a user interface of the mobile device.

17. A non-transitory computer readable storage medium storing instructions executable by one or more processing devices of a system to perform a method for surfacing incoming call display data, the method comprising:
generating a call from a call source to a call destination;
receiving incoming call display data determined in response to receiving the call, wherein the incoming call display data includes data displayed by a user interface associated with the call destination in response to receiving the call; and
transmitting incoming call display image data based on the incoming call display data to a computing device to display a representation of the data displayed by the user interface associated with the call destination.

18. The non-transitory computer readable storage medium of claim 17, wherein the call destination comprises a mobile device, and wherein the user interface associated with the call destination is displayed on a call screen of the mobile device.

19. The non-transitory computer readable storage medium of claim 18, wherein receiving the incoming call display data includes capturing, by one or more processing devices, a screenshot of the call screen of the mobile device when the mobile device receives the call.

20. The non-transitory computer readable storage medium of claim 18 further comprising:
receiving call logs collected by the mobile device of the call destination, the call logs collected in response to receiving the call from the call source, wherein the call logs are for respective calls received; and
receiving one or more captured screenshots, each captured screenshot being of a call screen on the user interface associated with the mobile device.

* * * * *